United States Patent
Owoeye et al.

(10) Patent No.: US 12,234,748 B2
(45) Date of Patent: Feb. 25, 2025

(54) GAS TURBINE ENGINE HAVING OUTLET GUIDE VANES

(71) Applicants: General Electric Company, Schenectady, NY (US); General Electric Company Polska sp. z o.o., Warsaw (PL)

(72) Inventors: Eyitayo James Owoeye, Houston, TX (US); Ravindra Shankar Ganiger, Bengaluru (IN); Adam Tomasz Pazinski, Warsaw (PL)

(73) Assignees: General Electric Company, Evendale, OH (US); General Electric Company Polska sp. z o.o., Warsaw (PL)

( * ) Notice: Subject to any disclaimer, the term of this patent is extended or adjusted under 35 U.S.C. 154(b) by 70 days.

(21) Appl. No.: 18/334,799

(22) Filed: Jun. 14, 2023

(65) Prior Publication Data

US 2024/0418094 A1    Dec. 19, 2024

(51) Int. Cl.
  *F01D 9/04*    (2006.01)
  *F02K 3/06*    (2006.01)

(52) U.S. Cl.
  CPC ........... *F01D 9/041* (2013.01); *F02K 3/06* (2013.01); *F05D 2260/2214* (2013.01); *F05D 2260/232* (2013.01); *F05D 2260/606* (2013.01)

(58) Field of Classification Search
  CPC ............ F05D 2200/00; F05D 2200/20; F05D 2200/22; F05D 2200/30; F05D 2260/221
  See application file for complete search history.

(56) References Cited

U.S. PATENT DOCUMENTS

| | | | |
|---|---|---|---|
| 8,333,552 B2 | 12/2012 | Wood et al. | |
| 8,616,834 B2 | 12/2013 | Knight, III et al. | |
| 10,196,932 B2 | 2/2019 | Sennoun | |
| 10,260,523 B2 | 4/2019 | Snyder | |
| 10,378,556 B2 | 8/2019 | Zaccardi et al. | |
| 10,697,312 B2 | 6/2020 | Boutaleb et al. | |
| 10,830,056 B2 | 11/2020 | Erno et al. | |
| 10,883,382 B2 | 1/2021 | Boutaleb et al. | |
| 10,975,722 B2 * | 4/2021 | Marquie | F01D 9/041 |
| 11,015,468 B2 | 5/2021 | Zaccardi et al. | |
| 11,125,091 B2 | 9/2021 | Zaccardi et al. | |
| 11,143,045 B2 | 10/2021 | Zaccardi et al. | |
| 2017/0314471 A1 | 11/2017 | Sennoun | |
| 2021/0010376 A1 | 1/2021 | Erno et al. | |
| 2022/0307417 A1 | 9/2022 | Diaz | |

* cited by examiner

*Primary Examiner* — Courtney D Heinle
*Assistant Examiner* — Danielle M. Christensen
(74) *Attorney, Agent, or Firm* — Dority & Manning, P.A.

(57) ABSTRACT

A gas turbine engine is provided having a plurality of outlet guide vanes, each defining an internal thermal fluid passageway. The engine defining an Outlet Guide Vane Cooling Capacity greater than 0.01 and less than 13, wherein OGVCC equals:

$$\left[ HTSA_{OGV} \times \frac{BPR}{(BPR+1)} \times \frac{C_{air} \times (T_{inlet} - T_{air}) \times v_{flight} \times D_{fan}}{Fn_{Total} \times v_{tip\,speed} \times \Delta H} \right]^{1/3},$$

and
  wherein $$HTSA_{OGV} = N_{vane} \times \frac{D_{fan}^2 \times \left(1 - R_{OGV\_ratio}^2\right)}{2 \times \sin(180/N_{vane})} \times \sin\theta_{OGV} \times f_{OGV}.$$

20 Claims, 8 Drawing Sheets

| ENGINE PARAMETERS | EXAMPLE 1 | EXAMPLE 2 | EXAMPLE 3 | EXAMPLE 4 | EXAMPLE 5 |
|---|---|---|---|---|---|
| $D_{fan}$ (METERS, (M)) | 0.5 | 0.9 | 2 | 3.5 | 3.5 |
| $f_{OGV}$ | 0.05 | 3 | 10 | 18 | 20 |
| BPR | 3 | 10 | 15 | 20 | 25 |
| $R_{OGV\_ratio}$ | 0.8 | 0.6 | 0.4 | 0.25 | 0.2 |
| $N_{vane}$ | 20 | 40 | 60 | 100 | 120 |
| $\theta_{OGV}$ (degrees) | 35 | 50 | 75 | 70 | 75 |
| LP SPOOL SPEED, $N_1$ (RPM) | 20000 | 15000 | 10000 | 3000 | 4000 |
| GEAR RATIO | 1 | 1.5 | 2.5 | 3 | 3.5 |
| $Fn_{total}$ (kN) | 50 | 120 | 200 | 300 | 500 |
| $V_{flight}$ (METERS/SECOND) | 70 | 130 | 250 | 260 | 270 |
| $T_{inlet}$ (degrees celsius (C)) | 250 | 100 | 100 | 185 | 200 |
| $T_{air}$ (C) | 60 | 10 | -56.5 | -15 | -56.5 |
| $C_{air}$ (JOULES PER $M^3$ x C) | 1054.17 | 1238.04 | 365.27 | 1358.028 | 365.27 |
| $\Delta H$ (M) | 927 | 100 | 1.5 | 20 | 0.2 |
| OGVCC | 0.01 | 0.158 | 2.215 | 4.027 | 11.320 |

FIG. 6

GAS TURBINE ENGINE HAVING OUTLET GUIDE VANES

FIELD

The present disclosure relates to a gas turbine engine having outlet guide vanes.

BACKGROUND

Gas turbine engines, such as turbofan engines, may be used for aircraft propulsion. A turbofan engine generally includes a bypass fan section and a turbomachine to drive the bypass fan. The turbomachine generally includes a compressor section, a combustion section, and a turbine section in a serial flow arrangement. Both the compressor section and the turbine section are driven by a rotor shaft. Gas turbine engines generally include a thermal management system to manage thermal loads during operation of the gas turbine engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which:

FIG. 6 is a table depicting numerical values showing the relationships between various parameters in accordance with various example embodiments of the present disclosure.

DETAILED DESCRIPTION

Figure 1:
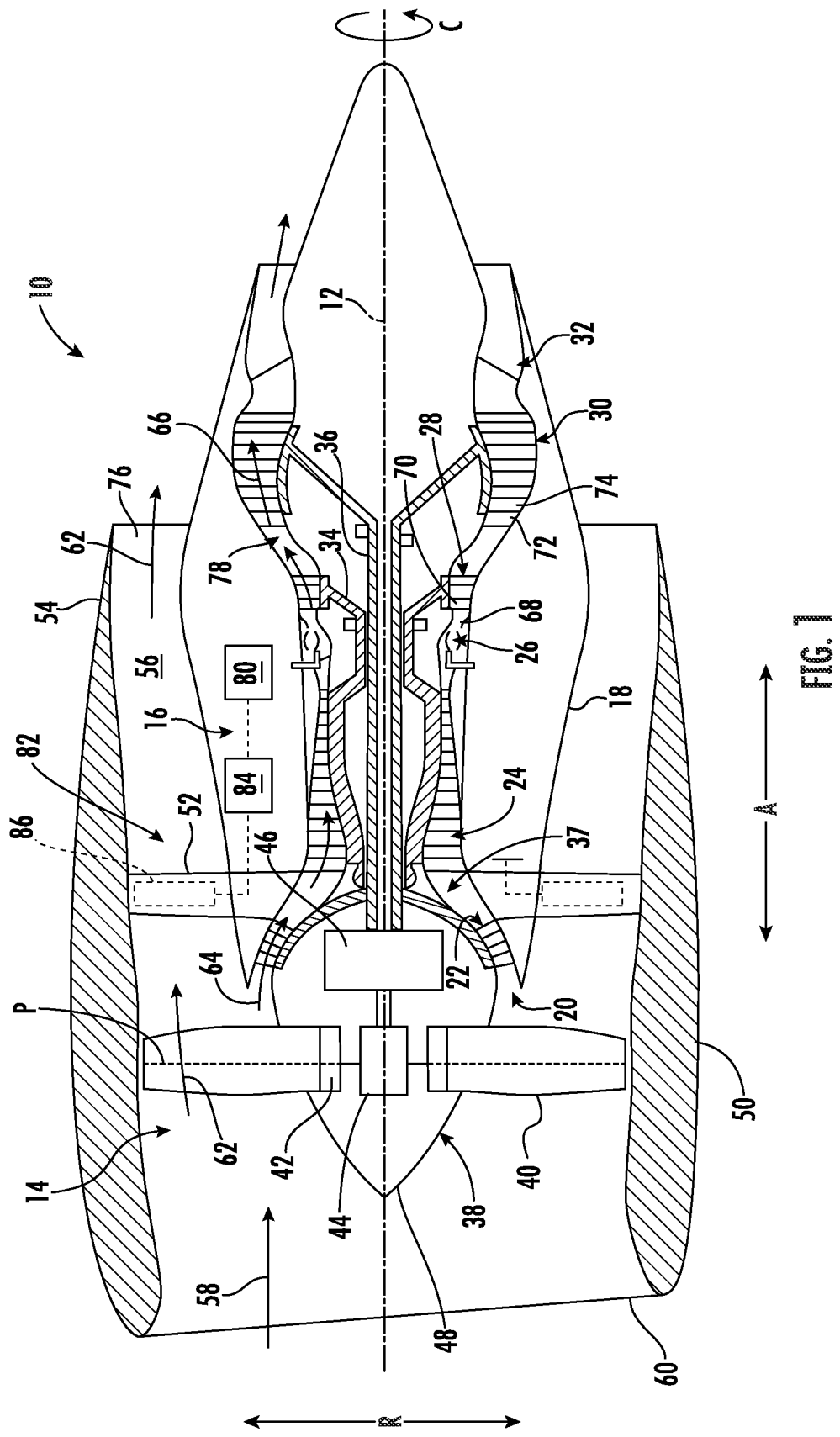
FIG. 1 is a schematic view of an exemplary gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The term "takeoff power level" refers to a power level of a gas turbine engine used during a takeoff operating mode of the gas turbine engine during a standard day operating condition.

The term "standard day operating condition" refers to ambient conditions of sea level altitude, 59 degrees fahrenheit, and 60 percent relative humidity.

The terms "upstream" and "downstream" refer to the relative direction with respect to fluid flow in a fluid pathway. For example, "upstream" refers to the direction from which the fluid flows, and "downstream" refers to the direction to which the fluid flows.

As used herein, the term "fan tip speed" as it relates to a plurality of fan blades of a fan, refers to a linear speed of an outer tip of a fan blade of the plurality of fan blades along a radial direction during operation of the fan. The fan tip speed may be calculated using the following equation: $\pi \times 2 \times R_{fan} \times N_1/GB_{gear\ ratio}$, wherein $R_{fan}$ is a fan radius of the fan, $N_1$ is a rotational speed of a shaft driving the fan in revolutions per minute, and $GB_{gear\ ratio}$ is a gear ratio of a reduction gearbox (if provided) across which the shaft drives the fan.

As used herein, the term "head loss" refers to a pressure lost by fluid flowing through a passage as a result of, e.g., turbulence caused by a velocity of the flowing fluid and a roughness of the surfaces forming the first passage.

The phrases "from X to Y" and "between X and Y" each refers to a range of values inclusive of the endpoints (i.e., refers to a range of values that includes both X and Y).

Generally, a turbofan engine includes a fan and a turbomachine, with the turbomachine rotating the fan to generate thrust. The turbomachine includes a compressor section, a combustion section, a turbine section, and an exhaust section and defines a working gas flowpath therethrough. As turbofan engines are driven to higher total thrust outputs, with greater propulsive efficiencies (e.g., less specific fuel consumption for a given amount of thrust output), thermal management within the turbofan engines becomes increasingly important. In particular, operating turbofan engines to generate higher total thrust outputs with greater efficiency can include operating at least certain sections of the turbofan engines at higher temperatures, operating components in a manner that generates more heat (e.g., gearboxes, bearings, etc.), or both.

The inventors of the present disclosure sought out to design an engine having a means to manage a large amount of heat without creating new inefficiencies in the turbofan engine, to allow for a net gain in propulsive efficiency. In particular, the inventors recognized that a bypass passage of the turbofan engine generally includes a large amount of airflow passing therethrough at a relatively low temperature. However, the bypass passage provides for a substantial amount of thrust for the turbofan engine (a majority of the thrust in at least certain engine configurations), such that introducing a heat exchanger within the bypass passage that introduces a significant pressure drop in the airflow through the bypass passage is generally undesirable.

Introducing heat exchangers into outlet guide vanes already present in the turbofan engine is possible. However, incorporating heat exchangers into the outlet guide vanes requires additional power to be added to the thermal management system to duct a heat transfer fluid to the outlet guide vanes, and introduces a complexity in the design and arrangement of the turbofan engine. Further, outlet guide vanes are generally designed to optimize an aerodynamic efficiency of an airflow through the bypass passage, such that a number, arrangement, and geometry of the outlet guide vane may not accommodate a desired amount of heat transfer. While modification of the number, arrangement, and geometry of the outlet guide vanes is possible to achieve a desired amount of heat transfer, an aerodynamic efficiency cost of such a design may exceed the thermal management benefits. Previous thinking has accordingly been than any modification of an aerodynamically optimized design of the outlet guide vanes would result in a net propulsive efficiency decrease for the turbofan engine; and further that incorporating heat exchangers into an aerodynamically optimized design of outlet guide vanes would not yield a sufficient amount of heat transfer to justify the additional power usage requirements, complexity, etc.

However, the inventors discovered, unexpectedly, in the course of designing a turbofan engine having heat exchangers integrated into the outlet guide vanes for the above noted needs, that the costs associated with inclusion of heat exchangers integrated into the outlet guide vanes capable of providing a desired amount of heat transfer may be overcome by the thermal management benefits in at least certain designs, contrary to previous thinking and expectations. In particular, the inventors discovered during the course of designing several turbofan engines having heat exchangers integrated into the outlet guide vanes of varying thrust classes and thermal management requirements (including the configurations illustrated and described herein), a relationship exists among an outlet guide vane heat transfer surface area parameter, an amount of airflow through the bypass passage available for cooling, and a capacity of such airflow for cooling, whereby including heat exchangers integrated in the outlet guide vanes in accordance with one or more of the exemplary aspects described herein may result in a net benefit to the overall engine design.

With a goal of arriving at an improved gas turbine engine capable of providing desired heat rejection capacity, the inventors proceeded in the manner of designing turbofan engines having heat exchangers integrated into the outlet guide vanes with various outlet guide vane heat transfer surface area parameters, various amounts of airflow through the bypass passage available for cooling, and various capacities of such airflow for cooling; checking an operability and thermal rejection characteristics of the designed turbofan engines; redesigning the turbofan engines to vary the noted parameters based on the impact on other aspects of the turbofan engines; rechecking the operability and thermal rejection characteristics of the redesigned turbofan engines; etc. during the design of several different types of heat exchangers integrated into the outlet guide vanes, including the heat exchangers integrated into the outlet guide vanes described herein, which are described below in greater detail.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine, sometimes also referred to as a "turbofan engine." As shown in FIG. 1, the gas turbine engine 10 defines an axial direction A (extending parallel to a longitudinal centerline 12 provided for reference), a radial direction R. and a circumferential direction C extending about the longitudinal centerline 12. In general, the gas turbine engine 10 includes a fan section 14 and a turbomachine 16 disposed downstream from the fan section 14.

The exemplary turbomachine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft 34 (which may additionally or alternatively be a spool) drivingly connects the HP turbine 28 to the HP compressor 24. A low pressure (LP) shaft 36 (which may additionally or alternatively be a spool) drivingly connects the LP turbine 30 to the LP compressor 22. The compressor section, combustion section 26, turbine section, and jet exhaust nozzle section 32 together define a working gas flowpath 37.

For the embodiment depicted, the fan section 14 includes a fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40, e.g., in unison. The gas turbine engine 10 further includes a power gear box 46, and the fan blades 40, disk 42, and pitch change mechanism 44 are together rotatable about the longitudinal centerline 12 by LP shaft 36 across the power gear box 46. The power gear box 46 includes a plurality of gears for adjusting a rotational speed of the fan 38 relative to a rotational speed of the LP shaft 36, such that the fan 38 may rotate at a more efficient fan speed. In such a manner, it will be appreciated that the power gear box 46 defines a gear ratio equal to an input rotational speed (i.e., a rotational speed of the LP shaft 36 in the embodiment of FIG. 1) divided by an output rotational speed (i.e., a rotational speed of the fan 38 in the embodiment of FIG. 1).

Referring still to the exemplary embodiment of FIG. 1, the disk 42 is covered by rotatable front hub 48 of the fan section 14 (sometimes also referred to as a "spinner"). The front hub 48 aerodynamically contoured to promote an airflow through the plurality of fan blades 40.

Additionally, the exemplary fan section 14 includes an annular fan casing or outer nacelle 50 that circumferentially surrounds the fan 38 and/or at least a portion of the turbomachine 16. It should be appreciated that the nacelle 50 is supported relative to the turbomachine 16 by a plurality of circumferentially-spaced outlet guide vanes 52 in the embodiment depicted. Moreover, the nacelle 50, including a downstream section 54 of the nacelle 50, extends over an outer portion of the turbomachine 16 so as to define a bypass passage 56 therebetween. The plurality of outlet guide vanes 52 are located within the bypass passage 56 (i.e., extend through the bypass passage 56) at a location downstream of the fan 38.

During operation of the gas turbine engine 10, a volume of air 58 enters the gas turbine engine 10 through an associated inlet 60 of the nacelle 50 and fan section 14. As the volume of air 58 passes across the fan blades 40, a first portion of air 62 is directed or routed into the bypass passage 56 and a second portion of air 64 as indicated by arrow 64 is directed or routed into the working gas flowpath 37, or more specifically into the LP compressor 22. The ratio between the first portion of air 62 and the second portion of air 64 is commonly known as a bypass ratio. A pressure of the second portion of air 64 is then increased as it is routed through the HP compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft 34, thus causing the HP shaft 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass passage 56 before it is exhausted from a fan nozzle exhaust section 76 of the gas turbine engine 10, also providing propulsive thrust. The HP turbine 28, the LP turbine 30, and the jet exhaust nozzle section 32 at least partially define a hot gas path 78 for routing the combustion gases 66 through the turbomachine 16.

As will be appreciated, the gas turbine engine 10 defines a total engine thrust $Fn_{Total}$ during an operating condition of the gas turbine engine 10. The total engine thrust $Fn_{Total}$ may generally be equal to a sum of: a fan stream thrust $Fn_{Fan}$ (i.e., an amount of thrust generated by the fan 38 through the bypass passage 56) and a turbomachine thrust $Fn_{TM}$ (i.e., an amount of thrust generated by an airflow through the jet exhaust nozzle section 32), each during the operating condition. The operating condition may be a high power operating condition, such as a takeoff operating condition, a climb operating condition, a maximum power cruise operating condition, etc. For example, the operating condition may be one in which the engine provides a takeoff power level of thrust.

Further, the gas turbine engine 10 may be configured to generate a total sea level static thrust output, corrected to standard day conditions, which is generally equal to a takeoff power level of thrust. It will be appreciated that "sea level static thrust corrected to standard day conditions" refers to an amount of thrust an engine is capable of producing while at rest relative to the earth and the surrounding air during standard day operating conditions.

The gas turbine engine 10 may define a total sea level static thrust output greater than or equal to 11,000 pounds. For example, it will be appreciated that the gas turbine engine 10 may be configured to generate at least 25,000 pounds and less than 115,000 pounds, such as between 25,000 and 80,000 pounds, such as between 35,000 and 65,000 pounds of thrust during a takeoff operating power, corrected to standard day sea level conditions.

It should be appreciated, however, that the exemplary gas turbine engine 10 depicted in FIG. 1 is by way of example only, and that in other exemplary embodiments, the gas turbine engine 10 may have any other suitable configuration. For example, although the gas turbine engine 10 depicted is configured as a ducted gas turbine engine (i.e., including the outer nacelle 50), in other embodiments, the gas turbine engine 10 may be an unducted gas turbine engine (such that the fan 38 is an unducted fan, and the outlet guide vanes 52 are cantilevered from the outer casing 18). Additionally, or alternatively, although the gas turbine engine 10 depicted is configured as a geared gas turbine engine (i.e., including the power gear box 46) and a variable pitch gas turbine engine (i.e., including a fan 38 configured as a variable pitch fan), in other embodiments, the gas turbine engine 10 may additionally or alternatively be configured as a direct drive gas turbine engine (such that the LP shaft 36 rotates at the same speed as the fan 38), as a fixed pitch gas turbine engine (such that the fan 38 includes fan blades 40 that are not rotatable about a pitch axis P), or both. It should also be appreciated, that in still other exemplary embodiments, aspects of the present disclosure may be incorporated into any other suitable gas turbine engine.

Referring still to FIG. 1, it will be appreciated that the gas turbine engine further includes one or more engine systems 80. The one or more engine systems 80 may include a lubrication oil system (providing lubrication oil to various bearings, power gear box 46, etc.), a power electronics system, an integrated drive generator, etc., including combinations thereof. The one or more engine systems 80 may generate a relatively large amount of heat during at least certain operations.

Accordingly, the exemplary gas turbine engine 10 of FIG. 1 further includes a thermal management system 82 in thermal communication with the one or more engine systems 80 for reducing a temperature of the one or more engine system 80. The thermal management system 82 generally includes a circulation assembly 84 (which may generally include a pump) and a plurality of heat exchanger 86 integrated with the outlet guide vanes 52. In such a manner, the thermal management system 82 is integrated with the turbomachine 16 and the outlet guide vanes 52.

Figure 2:
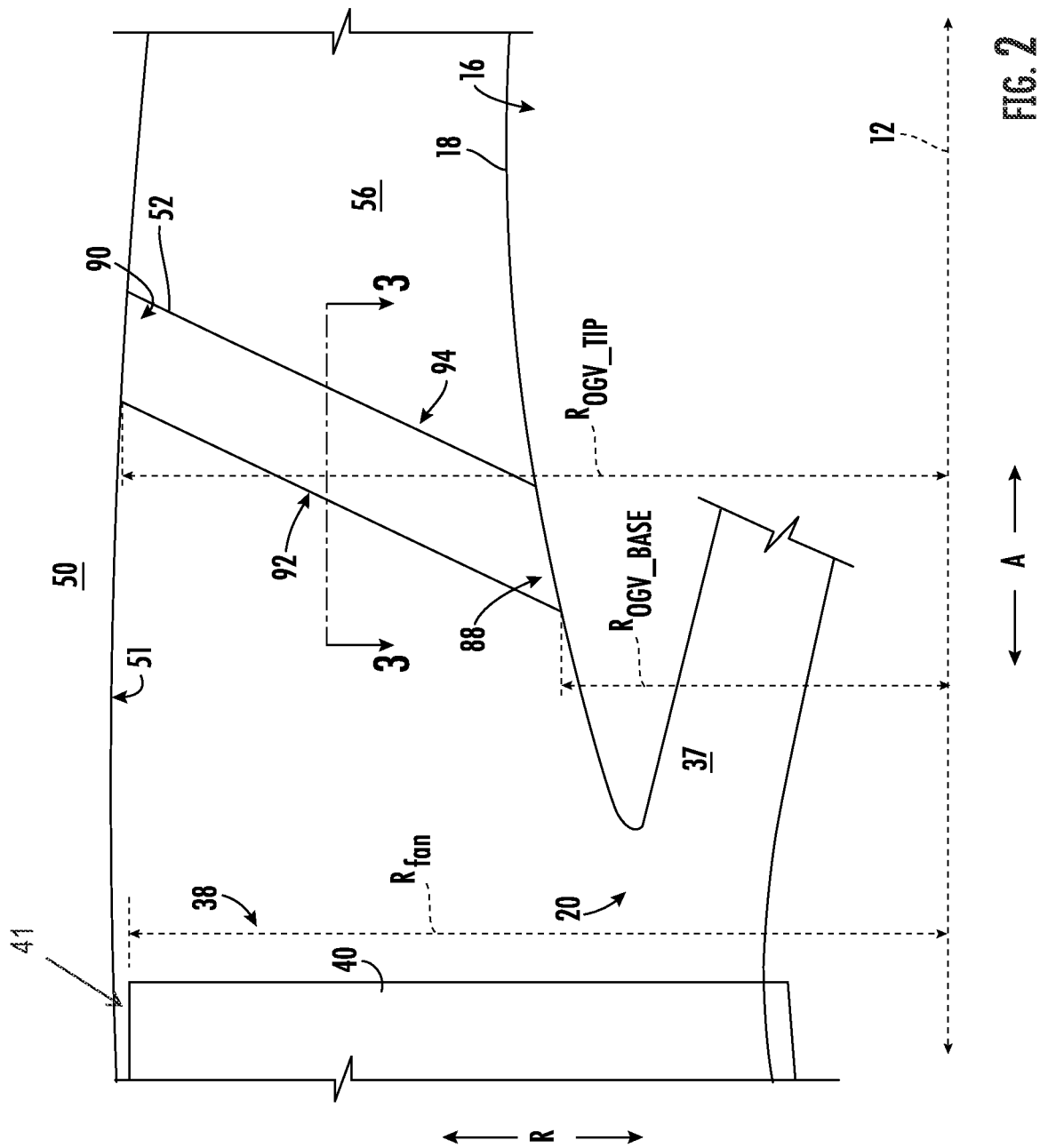
FIG. 2 is a close-up schematic view of an outlet guide vane in accordance with an exemplary aspect of the present disclosure.

Referring now to FIG. 2, a close-up, schematic view is provided of the gas turbine engine 10 of FIG. 1, and particularly of the plurality of outlet guide vanes 52 of the gas turbine engine 10 of FIG. 1. Note that the aspects of the thermal management system 82 are omitted from the view in FIG. 2 for clarity.

As noted above, the plurality of outlet guide vanes 52 are located within the bypass passage 56, and extend through the bypass passage 56, at a location downstream of the fan 38. In particular, each outlet guide vane 52 extends between a base 88 and a tip 90, generally along the radial direction R, and defines a leading edge 92 and a trailing edge 94. The base 88 is coupled to the turbomachine 16 and meets the outer casing 18. The tip 90 is coupled to the outer nacelle 50 and meets an inner surface 51 of the outer nacelle 50.

Further, each outlet guide vane 52 defines a base radius $R_{OGV\_Base}$ and a tip radius $R_{OGV\_Tip}$. The base radius $R_{OGV\_Base}$ is a distance along the radial direction R from the longitudinal centerline 12 to a location where the leading edge 92 of the outlet guide vane 52 meets the outer casing 18, and the tip radius $R_{OGV\_Tip}$ is a distance along the radial direction R from the longitudinal centerline 12 to a location where the leading edge 92 of the outlet guide vane 52 meets the inner surface 51 of the nacelle 50. A ratio of the base radius $R_{OGV\_Base}$ to the tip radius $R_{OGV\_Tip}$ may be referred to herein as an outlet guide vane radius ratio, $R_{OGV\_ratio}$.

Figure 3:
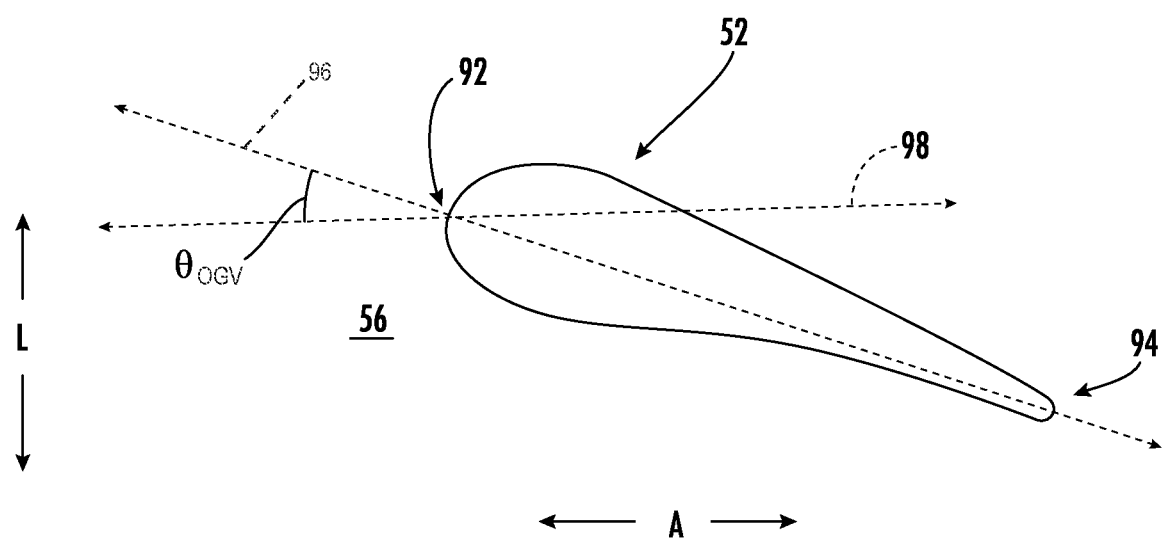
FIG. 3 is a schematic view of the outlet guide vane of FIG. 2 as viewed along a radial direction of the gas turbine engine.

Further, referring now briefly to FIG. 3, providing a view of the outlet guide vane 52 along the radial direction R, as is indicated by Line 3-3 in FIG. 2, it will be appreciated that each of the outlet guide vanes 52 defines a pitch angle, referred to herein as an OGV angle, $\theta_{OGV}$, with a reference line 98 defined by the gas turbine engine 10; the reference line 98 being parallel to the axial direction A and longitudinal centerline 12. In particular, the outlet guide vane 52 defines a reference line 96 extending from the leading edge 92 to the trailing edge 94 at a 50% span location, and the OGV angle, $\theta_{OGV}$, is an angle between the reference line 96 and the reference line 98.

Further, still, it will be appreciated that the fan blades 40 of the fan 38 each include a tip 41 at an outermost location along the radial direction R, and the fan 38 defines a fan radius, $R_{fan}$, equal to a distance along the radial direction R from the longitudinal centerline 12 to the tips 41 of the fan blades 40. The fan 38 further defines a fan diameter, $D_{fan}$, equal to two times the fan radius, $R_{fan}$.

As discussed above, the present disclosure generally provides for a gas turbine engine having a thermal management system integrated with a turbomachine and outlet guide vanes of the gas turbine engine.

Figure 4:
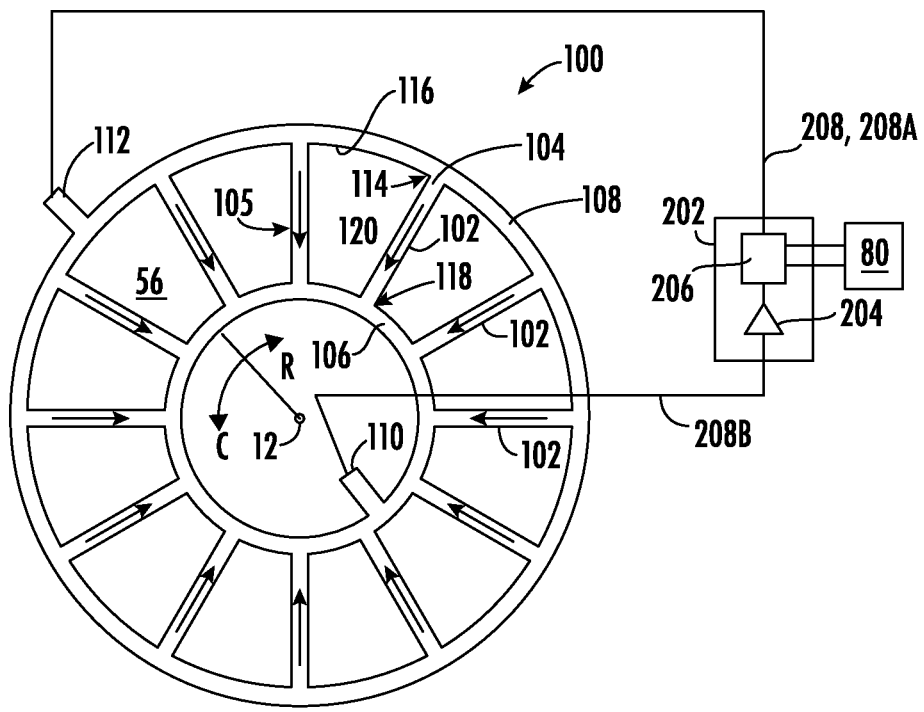
FIG. 4 is a schematic diagram of an outlet guide vane assembly according to an exemplary embodiment of the present disclosure.

Referring now to FIG. 4, FIG. 4 provides a schematic diagram of an exemplary outlet guide vane assembly 100, according to various embodiments of the present disclosure. The exemplary outlet guide vane assembly 100 may be incorporated into a gas turbine engine configured in a similar manner as the exemplary gas turbine engine 10 of FIG. 1.

As shown in FIG. 4, the outlet guide vane assembly 100 includes a plurality of outlet guide vanes 102, and in particular, the plurality of outlet guide vanes 102 includes a number, $N_{OGV}$, of outlet guide vanes 102. $N_{OGV}$ is 12 in the embodiment of FIG. 4. It should be appreciated, however, that the number, $N_{OGV}$, of outlet guide vanes 102 shown in FIG. 4 is not limiting, and that the outlet guide vane assembly 100 may include more outlet guide vanes 102 or less outlet guide vanes 102 than is shown, as is discussed in more detail below.

As shown in FIG. 4, each outlet guide vane 102 includes a heat exchanger integrated therein. In such a manner, the outlet guide vane assembly 100 depicted may be configured as part of a thermal management system 200 of a gas turbine engine including the outlet guide vane assembly 100.

More specifically, each outlet guide vane 102 extends along a radial direction R through a bypass passage 56 (see, e.g., bypass passage 56 of FIGS. 1 and 2) and defines an internal thermal fluid passageway 104. The internal thermal fluid passageway 104 is in thermal communication with an outer surface 105 of the respective outlet guide vane 102, allowing the outlet guide vane 102 to function as a heat exchanger between a heat transfer fluid flowing through the internal thermal fluid passageway 104 and an airflow through the bypass passage 56.

In the exemplary embodiment depicted, the outlet guide vane assembly 100 further includes a first ring manifold and a second ring manifold. More specifically, for the embodiment of FIG. 4, the first ring manifold and the second ring manifold are an inner-ring manifold 106 and an outer-ring manifold 108. Each outlet guide vane 102 extends radially between the inner-ring manifold 106 and the outer-ring manifold 108. The inner-ring manifold 106 may be positioned inward of an outer casing of a turbomachine (e.g., inward of outer casing 18 of turbomachine 16 in FIG. 1 along the radial direction R), and the outer-ring manifold 108 may be positioned outward of an inner surface of an outer nacelle (e.g., inner surface 51 of outer nacelle 50 in FIG. 1 along the radial direction R).

The inner-ring manifold 106 includes an opening 110 for allowing fluid to flow into or out of the inner-ring manifold 106. The outer-ring manifold 108 includes an opening 112 for allowing fluid to flow into or out of the outer-ring manifold 108. Each internal thermal fluid passageway is in fluid communication with the inner-ring manifold 106 and the outer-ring manifold 108. The internal thermal fluid passageway may be formed by one or more channels, slots, chambers or the like defined within a respective outlet guide vane 102, which allows a cooling fluid to flow between the inner-ring manifold 106 and the outer-ring manifold 108.

Figure 5:
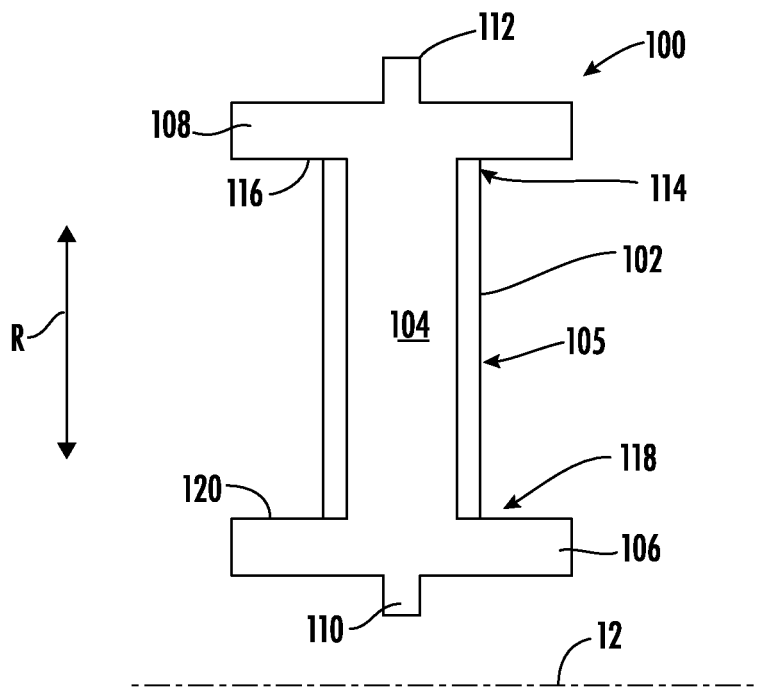
FIG. 5 is a schematic diagram of a portion of the outlet guide vane assembly as shown in FIG. 4.

Referring briefly also to FIG. 5, FIG. 5 provides a schematic diagram of a portion of the outlet guide vane assembly 100 as shown in FIG. 4. In an exemplary embodiment, as shown in FIGS. 4 and 5 collectively, each outlet guide vane 102 includes a radially outer portion 114 with respect to the radial direction R and a longitudinal centerline 12 (i.e., of the gas turbine engine; see longitudinal centerline 12 of FIG. 1) that is rigidly connected to an inner-surface 116 of the outer-ring manifold 108. Each outlet guide vane 102 also includes a radially inner portion 118 with respect to radial direction R and longitudinal centerline 12 that is rigidly connected to an outer surface 120 of the inner-ring manifold 106.

Referring back specifically to FIG. 4, the thermal management system 200 is further provided for cooling, e.g., one or more engine systems 80 of a gas turbine engine including the thermal management system 200 (see, also, engine systems 80 of FIG. 1).

The thermal management system 200 further includes a circulation assembly 202, which includes a pump 204 in the embodiment shown, and a plurality of heat exchangers integrated with the outlet guide vanes 102. In the embodiment of FIG. 4, the "heat exchangers integrated with the outlet guide vanes" may refer to a structure of the outlet guide vanes 102 defining the internal thermal fluid passageways 104 and thermally connecting the internal thermal fluid passageway(s) 104 to the respective outer surfaces 105 of the outlet guide vanes 102.

In the embodiment depicted, the circulation assembly 202 further includes a heat exchanger 206 thermally connecting the heat transfer fluid of the thermal management system 200 to the one or more engine systems 80. In such a manner, it will be appreciated that the heat transfer fluid of the thermal management system 200 is separate from a fluid of the one or more engine systems 80.

It will be appreciated, however, that in other exemplary embodiments, the heat transfer fluid of the thermal management system 200 may be the same fluid as is circulated through the one or more engine systems 80. For example, the one or more engine systems 80 may be a lubrication oil system, and the one or more engine systems 80 may provide lubrication oil directly to the circulation assembly 202 for the circulation assembly 202 to circulate through the thermal management system 200 to cool such lubrication oil (which would be considered the "heat transfer fluid" of the thermal management system 200 in such a case).

Referring still to FIG. 4, the thermal management system 200 further includes a network of ducts 208 fluidly connecting the circulation assembly 202 with the inner-ring manifold 106 and the outer-ring manifold 108. In particular, the ducts 208 include one or more inflow ducts 208A providing the heat transfer fluid to the outer-ring manifold 108 and one or more outflow ducts 208B providing the heat transfer fluid from the inner-ring manifold 106.

In such a manner, it will be appreciated that the thermal management system 200 of FIG. 4 may utilize a relatively cool airflow through the bypass passage 56 to cool one or more engine systems 80, without requiring dedicated heat exchangers positioned in the bypass passage 56, potentially leading to a reduction in pressure drop in the bypass passage 56 while still obtaining a desired heat transfer.

As alluded to earlier, the inventors discovered, unexpectedly during the course of designing turbofan engines having heat exchangers integrated into the outlet guide vanes (OGVs)—i.e., designing turbofan engines having heat exchangers integrated into the OGVs capable of providing a desired amount of heat rejection, and evaluating an overall engine and heat transfer performance-a significant relationship exists between an outlet guide vane heat transfer surface area parameter, an amount of airflow through the bypass passage available for cooling, and a capacity of such airflow for cooling. The relationship can be thought of as an indicator of the ability of a turbofan engine having heat exchangers integrated into the OGVs to be able to reject a sufficient amount of heat from a heat transfer fluid to justify any additional power usage requirements and complexity, to outweigh any aerodynamic setbacks as result of the incorporates of the heat exchangers, or both. In particular, the inventors found a combination of these parameters that could indicate a particular turbofan engine design would be able to reject a sufficient amount of heat from a heat transfer fluid to justify any additional power usage requirements and complexity, to outweigh any aerodynamic setbacks as result of the incorporates of the heat exchangers, or both.

The relationship applies to a gas turbine engine having a fan and a turbomachine, and defining a bypass passage over the turbomachine with OGVs extending into and/or through the bypass passage. The relationship ties the outlet guide vane heat transfer surface area parameter (HTSA$_{OGV}$; which may generally relate an amount of surface area within an internal thermal fluid passageway of an OGV to an outer surface area of the OGV, a total number of OGVs, and the angle and spacing of the OGVs) to an amount of airflow through the bypass passage available for cooling (as is indicated by a size of the bypass ratio and certain operating conditions of the turbofan engine), and a capacity of such airflow for cooling, as described in more detail below.

In particular, the inventors discovered that inclusion of an array of OGVs, wherein the OGVs have an increased internal surface area (i.e., a total surface area of the internal thermal fluid passageways that receive heat transfer fluid to be cooled) relative to an outer surface area, may result in an increase in heat transfer capacity for the OGVs. Similarly, including a larger number of OGVs and OGVs spaced closer together may also result in an increase in heat transfer capacity for the OGVs at least in part due to an increase in turbulence of the airflow through the bypass passage flowing over the OGVs. However, as these aspects of the turbofan are increased, a pressure drop of the airflow through the bypass passage across the array of OGVs is also increased, which may reduce an amount of thrust produced by the turbofan engine (and thus an efficiency of the turbofan engine).

Notably, increasing the internal surface area, depending on a structure of the internal thermal fluid passageways, may also correspondingly increase a head loss of the heat transfer fluid across the internal thermal fluid passageways. While this generally is associated with increase heat transfer, such also requires more energy in the form of fluid pump(s) to drive the heat transfer fluid through the thermal management system.

Further, increasing a fan diameter of the fan and a bypass ratio of the turbofan engine may result in a higher amount of airflow being available to cool the heat transfer fluid flowing through the OGVs during operation. However, increasing these aspects may require a larger and more powerful turbomachine to effectively drive such a fan.

The relationship discovered, infra, can therefore be used to identify a turbofan engine with heat exchangers integrated into the OGVs capable of achieving a sufficient amount of heat rejection to justify any additional power usage requirements and complexity, to outweigh any aerodynamic setbacks as result of the incorporation of the heat exchangers, or both; and suited for a particular mission requirement, one that takes into account efficiency, weight, thermal capacity needs, complexity, reliability, and other factors influencing the optimal choice for a turbofan engine with heat exchangers integrated into the OGVs.

In addition to yielding an improved gas turbine engine with heat exchangers integrated into the OGVs, as explained in detail above, utilizing this relationship, the inventors found that the number of suitable or feasible turbofan engine designs capable of meeting the above design requirements could be greatly diminished, thereby facilitating a more rapid down selection of designs to consider as a turbofan engine (with heat exchangers integrated into the OGVs) is being developed. Such a benefit provides more insight to the requirements for a given turbofan engine well before specific technologies, integration and system requirements are developed fully. Such a benefit avoids late-stage redesign.

The desired relationship providing for the improved turbofan engine, discovered by the inventors, is an Outlet Guide Vane Cooling Capacity (OGVCC), expressed as:

$$\left[ HTSA_{OGV} \times \frac{BPR}{(BPR+1)} \times \frac{C_{air} \times (T_{inlet} - T_{air}) \times v_{flight} \times D_{fan}}{Fn_{Total} \times v_{tip\,speed} \times \Delta H} \right]^{1/3},$$

wherein $$HTSA_{OGV} = N_{vane} \times \frac{D_{fan}^2 \times (1 - R_{OGV\_ratio}^2)}{2 \times \sin(180/N_{vane})} \times \sin\theta_{vane} \times f_{OGV},$$

and wherein

BPR is a bypass ratio defined by the gas turbine engine;

$C_{air}$ is a volumetric heat capacity of an airflow through a bypass passage of the gas turbine engine, at a location immediate upstream of a plurality of OGVs, in Joules per meters cubed times degrees Celsius (J/m³× C), during an operating condition of the gas turbine engine;

$T_{air}$ is a temperature of the airflow through the bypass passage of the gas turbine engine, at the location immediately upstream of the plurality of OGVs, in degrees Celsius, during the operating condition of the gas turbine engine;

$T_{inlet}$ is a temperature of a heat transfer fluid provided to an inlet of internal thermal fluid passageways of the OGVs in degrees Celsius, during the operating condition of the gas turbine engine;

$V_{flight}$ is a flight speed, in meters per second, of the gas turbine engine during the operating condition of the gas turbine engine;

$D_{fan}$ is a fan diameter of a fan of the gas turbine engine in meters;

$D_{fan}^2$ is the square of the fan diameter in meters squared;

$V_{tip\_speed}$ is a tip speed, in meters per second, of the fan during the operating condition of the gas turbine engine;

$Fn_{Total}$ is a total thrust output of the gas turbine engine during the operating condition of the gas turbine engine;

$\Delta H$ is a head loss, in meters, of the heat transfer fluid across the internal thermal fluid passageways of the OGVs during the operating condition of the gas turbine engine;

$N_{vane}$ is the number of OGVs in the plurality of OGVs;

$R_{OGV\_ratio}$ is equal to a base radius of the OGVs divided by a tip radius of the OGVs;

$R_{OGV}^2$ ratio is the square of $R_{OGV\_ratio}$;

$\theta_{OGV}$ is an OGV angle, or rather an OGV pitch angle, in degrees, between a reference line extending from a leading edge of the OGV to a trailing edge of the OGV and a reference line parallel to an axial direction of the turbofan engine at a 50% span location of the OGV;

$f_{OGV}$ is a ratio of a total surface area of an internal thermal fluid passageway of an outlet guide vane of the plurality of OGVs to a total surface area of an external surface of the outlet guide vane exposed to the bypass passage.

For the above OGVCC, the parameters have values selected from the ranges below in TABLE 1 in an appropriate combination to meet the required range for the OGVCC values in accordance with the present disclosure:

TABLE 1

| Symbol | Description | Ranges (inclusive of endpoints) |
|---|---|---|
| OGVCC | Outlet Guide Vane Cooling Capacity | 0.01 to 13, such as 0.01 to 6.21, such as 3.23 to 13 |
| BPR | Bypass ratio | 3 to 30, such as 3 to 12, such as 13 to 30 |

TABLE 1-continued

| Symbol | Description | Ranges (inclusive of endpoints) |
|---|---|---|
| $T_{air}$ | Temperature of the airflow through the bypass passage | −56.6 degrees Celsius (C.) to 60 C. |
| $T_{inlet}$ | Temperature of a heat transfer fluid provided to an inlet of internal thermal fluid passageways of the OGVs | 50 C. to 250 C. |
| $V_{flight}$ | Flight speed | 50 meters per second to 300 meters per second |
| $C_{air}$ | Air volumetric capacity | 350 Joules per meters cubed times degrees Celsius to 1450 Joules per meters cubed times degrees Celsius |
| $D_{fan}$ | Fan diameter | 0.5 meters to 3.5 meters |
| $V_{tip\_speed}$ | Fan tip speed | 22 meters per second (m/s) to 3665 m/s |
| $Fn_{Total}$ | Engine thrust | 50 kilonewtons to 500 kilonewtons |
| $\Delta H$ | Head loss of heat transfer fluid across OGV | 0.2 meters to 927 meters |
| $N_{vane}$ | Number of OGVs | 8 to 120, such as 8 to 60 |
| $R_{OGV\_ratio}$ | OGV radius ratio | 0.2 to 0.8 |
| $\theta_{OGV}$ | OGV pitch angle | 0 degrees to 85 degrees, such as 15 degrees to 75 degrees |
| $f_{OGV}$ | OGV surface area function | 0.05 to 20, such as 0.05 to 5 |

Figure 7:
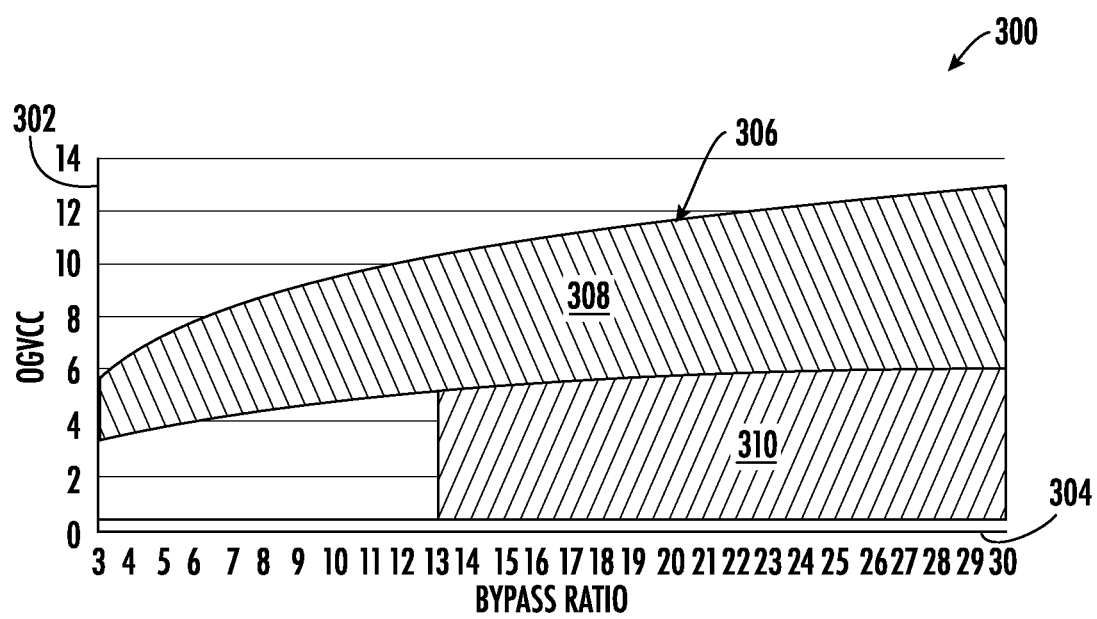
FIG. 7 is a graph depicting a range of parameters of gas turbine engines in accordance with various example embodiments of the present disclosure.

Referring now to FIGS. 6 and 7, various gas turbine engines with thermal management systems in accordance with the present disclosure are provided. FIG. 6 provides a table including numerical values corresponding to several gas turbine engines with thermal management systems falling within the ranges depicted in FIG. 7. FIG. 7 provides a plot 300 of OGVCC on a Y-axis 302 and bypass ratio on an X-axis 304.

As shown in FIG. 7, the plot 300 depicts a first range 306, with OGVCC values greater than or equal to 0.01 and less than or equal to 12.9 with a bypass ratio greater than or equal to 3 and less than or equal to 30.

FIG. 7 additionally depicts a second range 308, with the OGVCC values greater than or equal to 3.23 and less than or equal to 13 with a bypass ratio greater than or equal to 3 and less than or equal to 30. The second range 308 may generally correspond to engines having OGVs with, e.g., higher OGV surface area functions facilitated by multiple thermal fluid passages through the OGVs, complex geometries of fluid passages through the OGVs, etc.

FIG. 7 additionally depicts a third range 310, with the OGVCC values greater than or equal to 0.01 and less than or equal to 6.21 with a bypass ratio greater than or equal to 13 and less than or equal to 30. The third range 310 may generally correspond to engines having OGVs with, e.g., smaller OGV surface area functions as a result of more simplified thermal fluid passages through the OGVs, but with higher BPRs to provide a desired amount of heat transfer.

It will be appreciated that although the discussion above is generally related to a gas turbine engine having a thermal management system with a heat exchanger integrated into the outlet guide vanes 400, where the outlet guide vanes 400 each define a single direction internal thermal fluid passageway 410, in other exemplary embodiments, other configurations may be provided as well.

Figure 8:
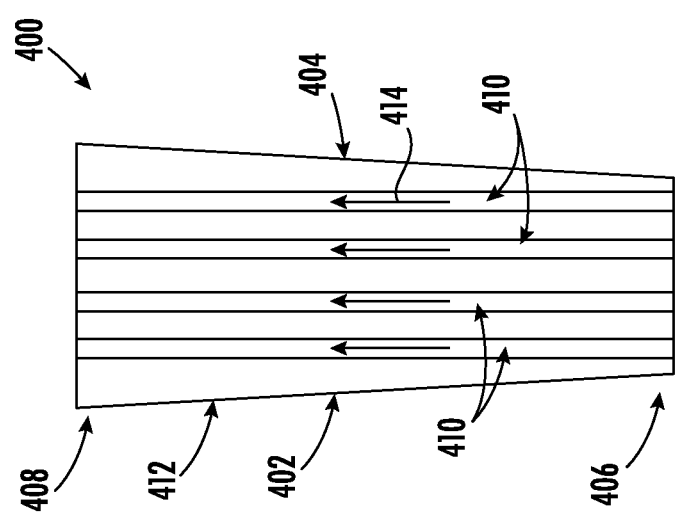
FIG. 8 is a schematic view of an outlet guide vane in accordance with another exemplary embodiment of the present disclosure.

For example, referring to FIG. 8, a cross-sectional view is provided of an outlet guide vane 400 having a heat exchanger integrated therein in accordance with another exemplary aspect of the present disclosure. The exemplary outlet guide vane 400 of FIG. 8 may be incorporated into one or more of the exemplary embodiments described herein, such as the exemplary system described above with reference to, e.g., FIG. 4.

Accordingly, it will be appreciated that the exemplary outlet guide vane 400 of FIG. 8 generally defines a leading edge 402, a trailing edge 404, a base 406, and a tip 408. The exemplary outlet guide vane 400 further defines an internal thermal fluid passageway 410 extending generally from the base 406 to the tip 408. However, for the embodiment depicted, the internal thermal fluid passageway 410 is a first internal thermal fluid passageway 410 of a plurality of internal thermal fluid passageways 410 defined by the outlet guide vane 400, with each extending generally from the base 406 to the tip 408. Each of the plurality of internal thermal fluid passageways 410 may be in thermal communication with an outer surface 412 of the outlet guide vane 400, to facilitate heat transfer from a heat transfer fluid 414 flowing through each of the plurality of internal thermal fluid passageways 410 to an airflow through a bypass passage through which the outlet guide vane 400 extends.

Figure 9:
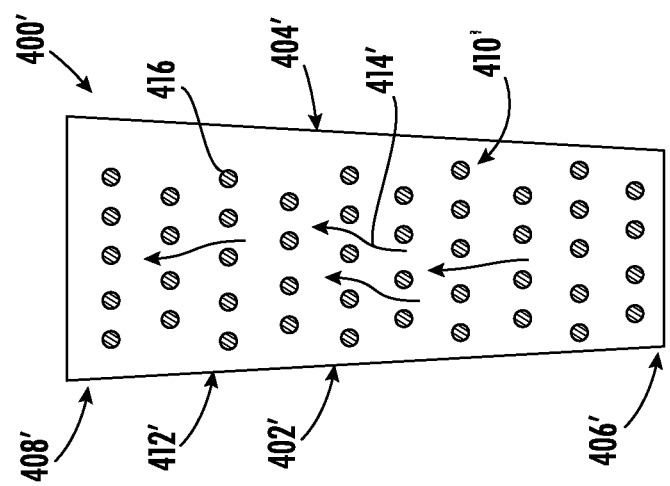
FIG. 9 is a schematic view of an outlet guide vane in accordance with yet another exemplary embodiment of the present disclosure.

Further, referring now to FIG. 9, a cross-sectional view is provided of an outlet guide vane 400' in accordance with another exemplary embodiment of the present disclosure having a heat exchanger integrated therein. The exemplary outlet guide vane 400' of FIG. 9 may be configured in a similar manner as exemplary outlet guide vane 400 of FIG. 8, and the same or similar numbers may refer to the same or similar parts. Further, the exemplary outlet guide vane 400' of FIG. 9 may similarly be integrated into one or more of the exemplary embodiments described herein, such as the exemplary embodiment described above with reference to, e.g., FIG. 4.

For example, the exemplary outlet guide vane 400' of FIG. 9 a generally defines an internal thermal fluid passageway 410'. The outlet guide vane 400' further includes a plurality of thermal members 416 extending through the internal thermal fluid passageway 410' to create a turbulence in a flow of heat transfer fluid 414' flowing through the internal thermal fluid passageway 410'. The thermal members 416 are configured as pins in the embodiment depicted. However, in other embodiments, the thermal members 416 may be configured in any other suitable manner having any other suitable geometry.

Figure 10:
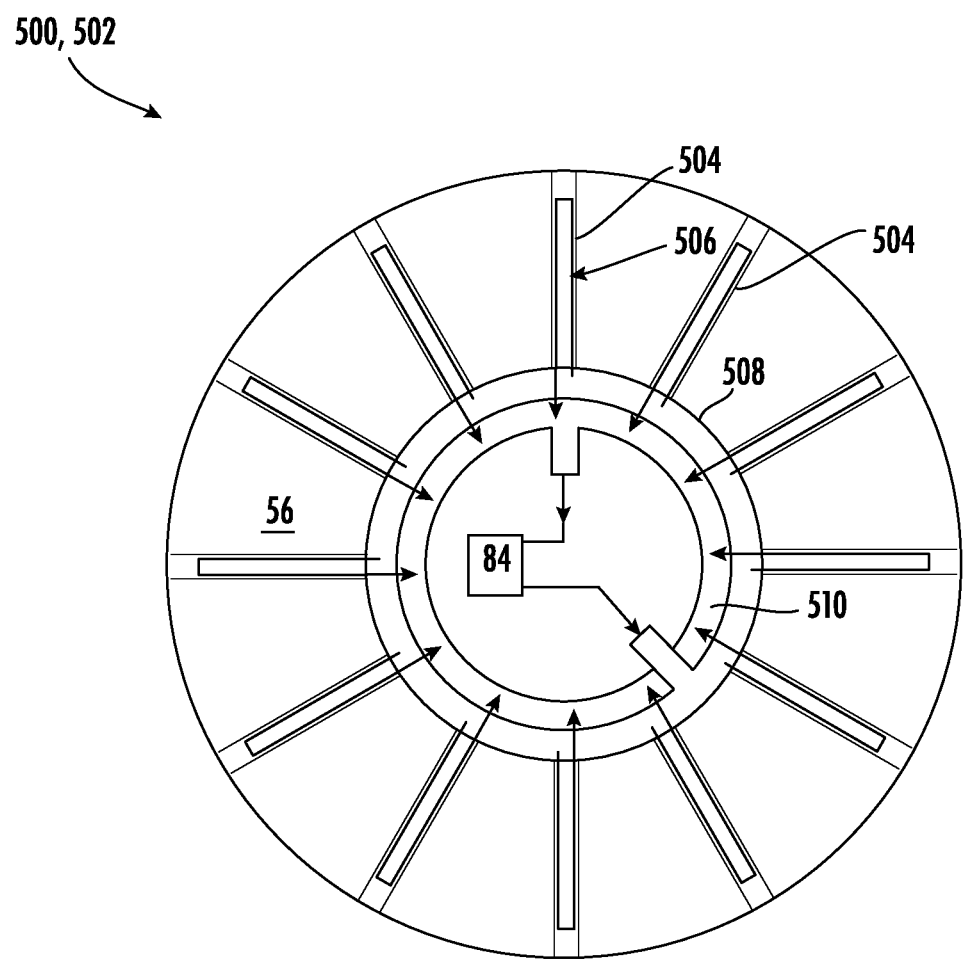
FIG. 10 is a schematic diagram of an outlet guide vane assembly according to another exemplary embodiment of the present disclosure.

Referring now to FIG. 10, an outlet guide vane assembly 500 and thermal management system 502 in accordance with another exemplary embodiment of the present disclosure is provided. The exemplary embodiment of FIG. 10 may be configured in a similar manner as the exemplary embodiment of FIG. 4 described above, and accordingly may be incorporated into a gas turbine engine, such as the gas turbine engine 10 of FIGS. 1 and 2.

For example, the exemplary embodiment of FIG. 10 generally includes a plurality of outlet guide vanes 504, with each outlet guide vane 504 defining an internal thermal fluid passageway 506. The thermal management system 502 further includes a first ring manifold 508 configured to provide a flow of heat transfer fluid 414 to the internal thermal fluid passageways 506 of the outlet guide vanes 504, and a second ring manifold 510 configured to receive the flow of heat transfer fluid 414 from the internal thermal fluid passageways 506 of the outlet guide vanes 504.

However, for the embodiment of FIG. 10, the first ring manifold 508 and second ring manifold 510 are each located inward of a bypass passage 56 along a radial direction R of the gas turbine engine. More specifically, for the embodiment depicted, the second ring manifold 510 is nested within the first ring manifold 508.

Figure 11:
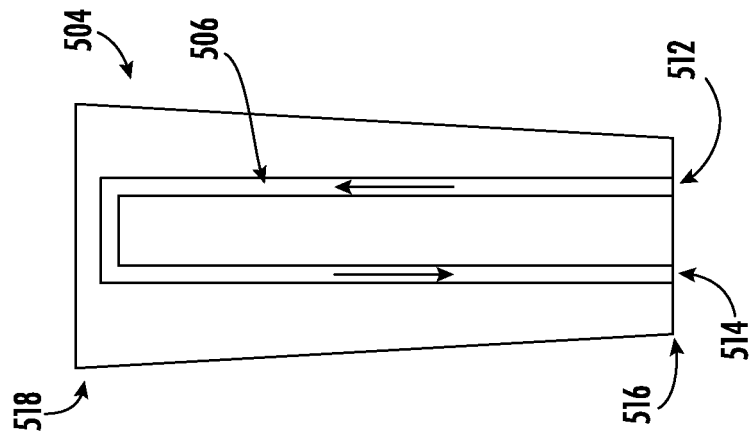
FIG. 11 is a schematic view of an outlet guide vane in accordance with still another exemplary embodiment of the present disclosure.

Referring now also to FIG. 11, providing a schematic, cross-sectional view of an outlet guide vane 504 of the plurality of outlet guide vanes 504 of FIG. 10, it will be appreciated that the internal thermal fluid passageway 506 defines an inlet 512 and an outlet 514, with each of the inlet 512 and the outlet 514 located at a base 516 of the outlet guide vane 504. In such a manner, the internal thermal fluid passageway 506 extends from the base 516 to a location proximate a tip 518 of the outlet guide vane 504 (i.e., a location closer to the tip 518 and the base 516), and back to the base 516.

Although a single loop is depicted in the embodiment of FIG. 11, the internal thermal fluid passageway 506 may define any other suitable shape, such as a serpentine shape, a multiple loop shape, etc.

As will be appreciated, the exemplary embodiment of FIGS. 10 and 11 may provide for a more centralized distribution system for the thermal management system 502.

Further aspects are provided by the subject matter of the following clauses:

A gas turbine engine defining a radial direction, the gas turbine engine comprising: a fan section having a fan defining a fan diameter, $D_{fan}$; a turbomachine rotatably coupled to the fan of the fan section and defining an inlet, the gas turbine engine defining a bypass passage downstream of the fan and outward of the turbomachine along the radial direction and a bypass ratio, BPR, equal to a ratio of an airflow through the bypass passage to an airflow through the inlet of the turbomachine during an operating condition of the gas turbine engine; a plurality of outlet guide vanes extending from the turbomachine at a location downstream of the fan, the plurality of outlet guide vanes including a number, $N_{vane}$, of outlet guide vanes, each outlet guide vane defining: a radius ratio, $R_{OGV\_ratio}$, equal to a tip radius of the outlet guide vane divided by a base radius of the outlet guide vane; an internal thermal fluid passageway; an outlet guide vane passageway size factor, $f_{OGV}$, equal to a total surface area of the internal thermal fluid passageway to a total surface area of an external surface of the outlet guide vane exposed to the bypass passage; a thermal management system integrated with the turbomachine and the plurality of outlet guide vanes, the thermal management system in fluid communication with the internal thermal fluid passageway of each of the plurality of outlet guide vanes for providing a heat transfer fluid to the internal thermal fluid passageway of each of the plurality of outlet guide vanes; wherein during operation of the gas turbine engine at the operating condition: an airflow through the bypass passage immediately upstream of the plurality of outlet guide vanes defines a temperature, $T_{air}$, in degrees Celsius and a volumetric heat capacity, $C_{air}$, in Joules/meters cubed-degrees Celsius; the thermal management system defines a heat transfer fluid temperature, $T_{inlet}$, at an inlet to the internal thermal fluid passageways, and a head loss, $\Delta H$, of the heat transfer fluid across each of the internal thermal fluid passageways; the gas turbine engine defines a flight speed, $v_{flight}$ and a total engine thrust, $Fn_{Total}$, and the fan defines a fan tip speed, $v_{tip\_speed}$; and an Outlet Guide Vane Cooling Capacity (OGVCC) greater than 0.01 and less than 13, wherein OGVCC equals:

$$\left[ HTSA_{OGV} \times \frac{BPR}{(BPR+1)} \times \frac{C_{air} \times (T_{inlet} - T_{air}) \times v_{flight} \times D_{fan}}{Fn_{Total} \times v_{tip\,speed} \times \Delta H} \right]^{1/3},$$

wherein $$HTSA_{OGV} = N_{vane} \times \frac{D_{fan}^2 \times (1 - R_{OGV\_ratio}^2)}{2 \times \sin(180/N_{vane})} \times \sin\theta_{OGV} \times f_{OGV}.$$

The gas turbine engine of any preceding clause, wherein OGVCC is greater than or equal to 0.01 and less than or equal to 6.21.

The gas turbine engine of any preceding clause, wherein BPR is greater than or equal to 3 and less than or equal to 30.

The gas turbine engine of any preceding clause, wherein OGVCC is greater than or equal to 3.23 and less than or equal to 13, and wherein BPR is greater than or equal to 13 and less than or equal to 30.

The gas turbine engine of any preceding clause, wherein $f_{OGV}$ is greater than or equal to 0.05 and less than or equal to 20.

The gas turbine engine of any preceding clause, wherein $f_{OGV}$ is greater than or equal to 0.05 and less than or equal to 5.

The gas turbine engine of any preceding clause, wherein $D_{fan}$ is greater than or equal to 0.5 meters and less than or equal to 3.5 meters, and wherein $N_{vane}$ is greater than or equal to 8 and less than or equal to 120.

The gas turbine engine of any preceding clause, wherein ΔH is less than or equal to 250 meters.

The gas turbine engine of any preceding clause, wherein $T_{inlet}$ is greater than or equal to 50 degrees Celsius and less than or equal to 250 degrees Celsius, and wherein $T_{air}$ is greater than or equal to −56.6 degrees Celsius and less than or equal to 60 degrees Celsius.

The gas turbine engine of any preceding clause, wherein the heat transfer fluid is a lubricating oil for the gas turbine engine.

The gas turbine engine of any preceding clause, wherein $\theta_{OGV}$ is greater than or equal to zero degrees and less than or equal to 85 degrees.

The gas turbine engine of any preceding clause, further comprising an outer nacelle surrounding at least in part the fan and the turbomachine, wherein the outlet guide vanes extend from the turbomachine to the outer nacelle.

A method of operating a gas turbine engine, the method comprising: operating the gas turbine engine in an operating condition, wherein the gas turbine engine comprises a plurality of outlet guide vanes extending from the turbomachine at a location downstream of a fan, the plurality of outlet guide vanes including a number, $N_{vane}$, of outlet guide vanes, each outlet guide vane defining: a radius ratio, $R_{OGV\_ratio}$, equal to a tip radius of the outlet guide vane divided by a base radius of the outlet guide vane; an internal thermal fluid passageway; and an outlet guide vane passageway size factor, $f_{OGV}$, equal to a total surface area of the internal thermal fluid passageway to a total surface area of an external surface of the outlet guide vane exposed to a bypass passage; wherein operating the gas turbine engine in the operating condition comprises operating the gas turbine engine to define a flight speed, $v_{flight}$, a total engine thrust, $Fn_{Total}$, and a bypass ratio, BPR; and operating a fan to define a fan diameter, $D_{fan}$, and a fan tip speed, $v_{tip\ speed}$; wherein an airflow through the bypass passage immediately upstream of the plurality of outlet guide vanes defines a temperature, $T_{air}$, in degrees Celsius and a volumetric heat capacity, $C_{air}$, in Joules/meters cubed-degrees Celsius (i.e., Joules/meters³×Degrees C.) while operating the gas turbine engine in the operating condition; wherein a heat transfer fluid of a thermal management system of the gas turbine engine defines a heat transfer fluid temperature, $T_{inlet}$, at an inlet to each internal thermal fluid passageway of each outlet guide vane of the plurality of outlet guide vanes, and a head loss, ΔH, across the internal thermal fluid passageways; and wherein operating the gas turbine engine in the operating condition further comprises defining an Outlet Guide Vane Cooling Capacity (OGVCC) greater than 0.01 and less than 13, wherein OGVCC equals:

$$\left[ HTSA_{OGV} \times \frac{BPR}{(BPR+1)} \times \frac{C_{air} \times (T_{inlet} - T_{air}) \times v_{flight} \times D_{fan}}{Fn_{Total} \times v_{tip\ speed} \times \Delta H} \right]^{1/3},$$

wherein $$HTSA_{OGV} = N_{vane} \times \frac{D_{fan}^2 \times (1 - R_{OGV\_ratio}^2)}{2 \times \sin(180/N_{vane})} \times \sin\theta_{OGV} \times f_{OGV}.$$

The method of any preceding clause, wherein OGVCC is greater than or equal to 0.01 and less than or equal to 6.21.

The method of any preceding clause, wherein BPR is greater than or equal to 3 and less than or equal to 30.

The method of any preceding clause, wherein BPR is greater than or equal to 13 and less than or equal to 30.

The method of any preceding clause, wherein $f_{OGV}$ is greater than or equal to 0.05 and less than or equal to 20.

The method of any preceding clause, wherein the heat transfer fluid is a lubricating oil for the gas turbine engine.

The method of any preceding clause, wherein $D_{fan}$ is greater than or equal to 0.5 meters and less than or equal to 3.5 meters, and wherein $N_{vane}$ is greater than or equal to 8 and less than or equal to 120.

The method of any preceding clause, wherein the gas turbine engine further comprises an outer nacelle surrounding at least in part the fan and the turbomachine, wherein the outlet guide vanes extend from the turbomachine to the outer nacelle.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine defining a radial direction, the gas turbine engine comprising:
    a fan section having a fan defining a fan diameter, $D_{fan}$;
    a turbomachine rotatably coupled to the fan of the fan section and defining an inlet, the gas turbine engine defining a bypass passage downstream of the fan and outward of the turbomachine along the radial direction and a bypass ratio, BPR, equal to a ratio of an airflow through the bypass passage to an airflow through the inlet of the turbomachine during an operating condition of the gas turbine engine;

a plurality of outlet guide vanes extending from the turbomachine at a location downstream of the fan, the plurality of outlet guide vanes including a number, $N_{vane}$, of outlet guide vanes, each outlet guide vane defining: a radius ratio, $R_{OGV\_ratio}$, equal to a tip radius of the outlet guide vane divided by a base radius of the outlet guide vane; an internal thermal fluid passageway; an outlet guide vane passageway size factor, $f_{OGV}$, equal to a total surface area of the internal thermal fluid passageway to a total surface area of an external surface of the outlet guide vane exposed to the bypass passage;

a thermal management system integrated with the turbomachine and the plurality of outlet guide vanes, the thermal management system in fluid communication with the internal thermal fluid passageway of each of the plurality of outlet guide vanes for providing a heat transfer fluid to the internal thermal fluid passageway of each of the plurality of outlet guide vanes;

wherein during operation of the gas turbine engine at the operating condition:

the airflow through the bypass passage immediately upstream of the plurality of outlet guide vanes defines a temperature, $T_{air}$, in degrees Celsius and a volumetric heat capacity, $C_{air}$, in Joules/meters cubed-degrees Celsius;

the thermal management system defines a heat transfer fluid temperature, $T_{inlet}$, at an inlet to the internal thermal fluid passageways, and a head loss, $\Delta H$, of the heat transfer fluid across each of the internal thermal fluid passageways;

the gas turbine engine defines a flight speed, $v_{flight}$ and a total engine thrust, $Fn_{Total}$, and the fan defines a fan tip speed, $v_{tip\ speed}$; and an Outlet Guide Vane Cooling Capacity (OGVCC) is greater than 0.01 and less than 13, wherein OGVCC equals:

$$\left[ HTSA_{OGV} \times \frac{BPR}{(BPR+1)} \times \frac{C_{air} \times (T_{inlet} - T_{air}) \times v_{flight} \times D_{fan}}{Fn_{Total} \times v_{tip\ speed} \times \Delta H} \right]^{1/3},$$

wherein $$HTSA_{OGV} = N_{vane} \times \frac{D_{fan}^2 \times (1 - R_{OGV\_ratio}^2)}{2 \times \sin(180/N_{vane})} \times \sin\theta_{OGV} \times f_{OGV}.$$

2. The gas turbine engine of claim 1, wherein the OGVCC is greater than or equal to 0.01 and less than or equal to 6.21.

3. The gas turbine engine of claim 1, wherein the BPR is greater than or equal to 3 and less than or equal to 30.

4. The gas turbine engine of claim 1, wherein the OGVCC is greater than or equal to 3.23 and less than or equal to 13, and wherein the BPR is greater than or equal to 13 and less than or equal to 30.

5. The gas turbine engine of claim 1, wherein $f_{OGV}$ is greater than or equal to 0.05 and less than or equal to 20.

6. The gas turbine engine of claim 1, wherein $f_{OGV}$ is greater than or equal to 0.05 and less than or equal to 5.

7. The gas turbine engine of claim 1, wherein $D_{fan}$ is greater than or equal to 0.5 meters and less than or equal to 3.5 meters, and wherein $N_{vane}$ is greater than or equal to 8 and less than or equal to 120.

8. The gas turbine engine of claim 1, wherein $\Delta H$ is less than or equal to 927 meters.

9. The gas turbine engine of claim 1, wherein $T_{inlet}$ is greater than or equal to 50 degrees Celsius and less than or equal to 250 degrees Celsius, and wherein $T_{air}$ is greater than or equal to −56.6 degrees Celsius and less than or equal to 60 degrees Celsius.

10. The gas turbine engine of claim 1, wherein the heat transfer fluid is a lubricating oil for the gas turbine engine.

11. The gas turbine engine of claim 1, wherein $\theta_{OGV}$ is greater than or equal to zero degrees and less than or equal to 85 degrees.

12. The gas turbine engine of claim 1, further comprising an outer nacelle surrounding at least in part the fan and the turbomachine, wherein the outlet guide vanes extend from the turbomachine to the outer nacelle.

13. A method of operating a gas turbine engine, the method comprising:

operating the gas turbine engine in an operating condition, wherein the gas turbine engine comprises a plurality of outlet guide vanes extending from a turbomachine at a location downstream of a fan, the plurality of outlet guide vanes including a number, $N_{vane}$, of outlet guide vanes, each outlet guide vane defining: a radius ratio, $R_{OGV\_ratio}$, equal to a tip radius of the outlet guide vane divided by a base radius of the outlet guide vane; an internal thermal fluid passageway; and an outlet guide vane passageway size factor, $f_{OGV}$, equal to a total surface area of the internal thermal fluid passageway to a total surface area of an external surface of the outlet guide vane exposed to a bypass passage;

wherein operating the gas turbine engine in the operating condition comprises operating the gas turbine engine to define a flight speed, $v_{flight}$, a total engine thrust, $Fn_{Total}$, and a bypass ratio, BPR; and operating the fan to define a fan tip speed, $v_{tip\ speed}$, the fan defining a fan diameter, $D_{fan}$ wherein an airflow through the bypass passage immediately upstream of the plurality of outlet guide vanes defines a temperature, $T_{air}$, in degrees Celsius and a volumetric heat capacity, $C_{air}$, in Joules/meters cubed-degrees Celsius while operating the gas turbine engine in the operating condition;

wherein a heat transfer fluid of a thermal management system of the gas turbine engine defines a heat transfer fluid temperature, $T_{inlet}$, at an inlet to each internal thermal fluid passageway of each outlet guide vane of the plurality of outlet guide vanes, and a head loss, $\Delta H$, across the internal thermal fluid passageways; and wherein operating the gas turbine engine in the operating condition further comprises defining an Outlet Guide Vane Cooling Capacity (OGVCC) greater than 0.01 and less than 13, wherein OGVCC equals:

$$\left[ HTSA_{OGV} \times \frac{BPR}{(BPR+1)} \times \frac{C_{air} \times (T_{inlet} - T_{air}) \times v_{flight} \times D_{fan}}{Fn_{Total} \times v_{tip\ speed} \times \Delta H} \right]^{1/3},$$

wherein $$HTSA_{OGV} = N_{vane} \times \frac{D_{fan}^2 \times (1 - R_{OGV\_ratio}^2)}{2 \times \sin(180/N_{vane})} \times \sin\theta_{OGV} \times f_{OGV}.$$

14. The method of claim 13, wherein the OGVCC is greater than or equal to 0.01 and less than or equal to 6.21.

15. The method of claim 13, wherein the BPR is greater than or equal to 3 and less than or equal to 30.

16. The method of claim 13, wherein the BPR is greater than or equal to 13 and less than or equal to 30.

17. The method of claim 13, wherein $f_{OGV}$ is greater than or equal to 0.05 and less than or equal to 20.

18. The method of claim 13, wherein the heat transfer fluid is a lubricating oil for the gas turbine engine.

19. The method of claim 13, wherein $D_{fan}$ is greater than or equal to 0.5 meters and less than or equal to 3.5 meters, and wherein $N_{vane}$ is greater than or equal to 8 and less than or equal to 120.

20. The method of claim 13, wherein the gas turbine engine further comprises an outer nacelle surrounding at least in part the fan and the turbomachine, wherein the outlet guide vanes extend from the turbomachine to the outer nacelle.

\* \* \* \* \*